R. Hart,
Harness Saddle.
No. 99,185. Patented Jan. 25, 1870.
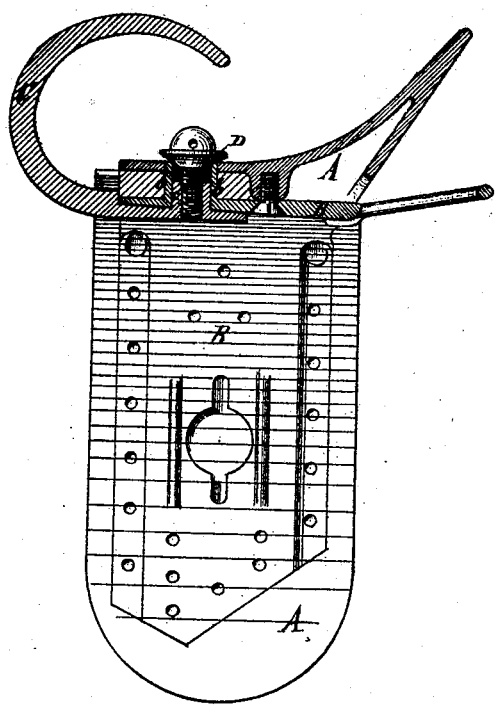
Fig. I.
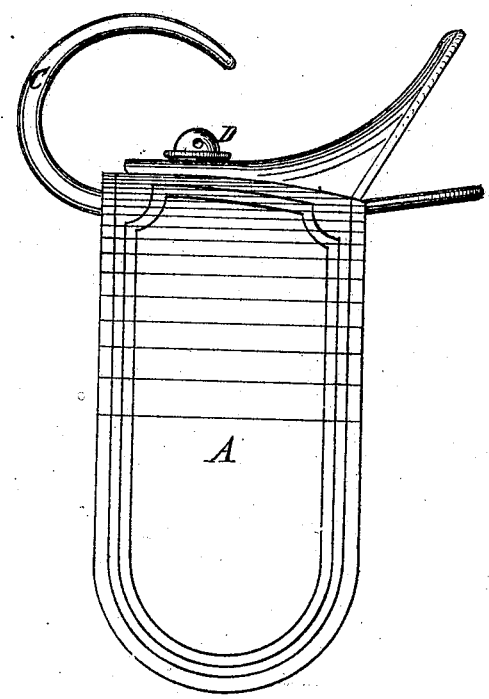
Fig. II.
Fig. III.

United States Patent Office.

ROBERT HART, OF DUNKIRK, NEW YORK.

Letters Patent No. 99,185, dated January 25, 1870.

IMPROVEMENT IN HARNESS-SADDLE HOOKS.

The Schedule referred to in these Letters Patent and making part of the same.

I, ROBERT HART, of Dunkirk, in the county of Chautauqua, and State of New York, have invented a certain new and useful Improvement in Gig-Saddle Hooks, of which the following is a specification.

My improvement relates more particularly to the manner of securing the hook to the "gig-tree" of harness.

The common mode of attachment is by means of a small screw-bolt passing from above through the saddle gig-tree and the shank of the hook, and fastened by a nut on the under side.

The projection of the nut and end of the bolt below the gig-tree, renders it necessary to employ an extra amount of padding to prevent abrading the animal's back.

If the nut gets slightly loose, the hook is left free to swing or work to one side. If broken, the hook cannot be replaced without ripping loose the padding.

My invention consists in the peculiar construction and arrangement of the hook, screw, and gig-tree, the former being provided with a square boss, fitting in a correspondingly-shaped hole or sleeve in the gig-tree, where it is secured by a screw, which screws from above into a threaded hole in the boss of the hook, whereby the use of a nut and its attendant objections are avoided.

In the accompanying drawings—
Figure I is a vertical section.
Figure II is a side elevation.
Figure III, a plan of the shank of the hook.

Like letters of reference designate like parts in each of the figures.

A is the saddle.
B is the gig-tree, provided with a flanged opening, $b$.
C is the hook, the shank of which is formed with a square boss, $c$, which fits in the opening $b$.
D is a screw that passes downward through the saddle, and screws into the threaded hole formed in the boss $c$, firmly clamping the parts together.

The flanged opening $b$ and the square boss $c$ prevent the twisting of the hook sidewise, even if the screw D should become loose.

This mode of attachment enables the padding to be attached to the gig-tree before fastening the hook, which catches the thread in securing the parts together.

The great advantage, however, of my improvement is the facility with which a broken hook can be replaced without ripping or removing the padding, as is required where a separate nut-fastening is employed, in order to gain access to the end of the bolt.

What I claim as my invention, is—

The hook C, provided with a square boss, $c$, arranged with the flanged opening $b$ of the gig-tree, and secured in place by a screw, D, substantially in the manner and for the purposes hereinbefore set forth.

ROBT. HART.

Witnesses:
W. T. COLMAN,
A. E. COLMAN.